UNITED STATES PATENT OFFICE.

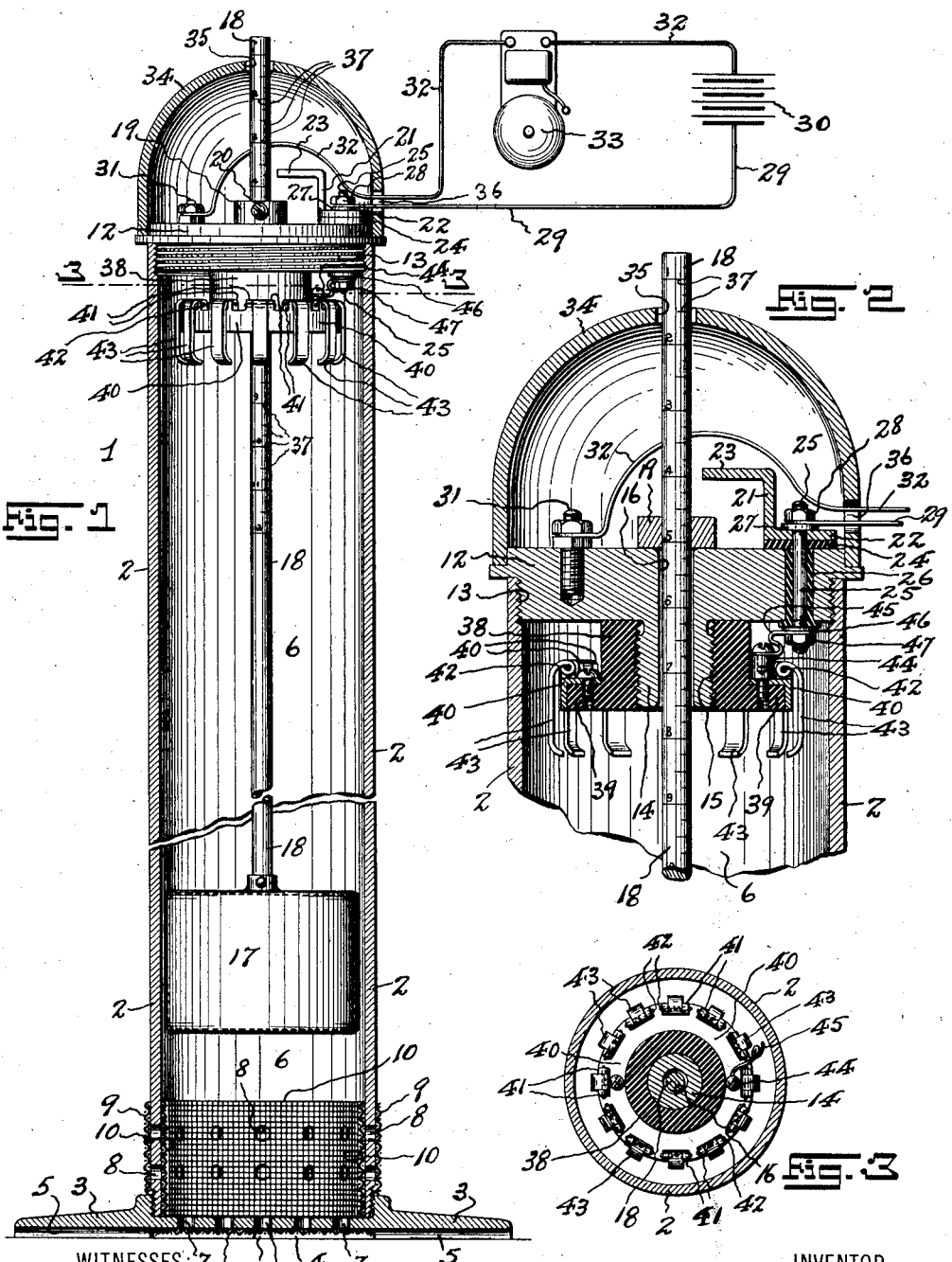

HERMAN H. LEE, OF BROOKLYN, NEW YORK.

LEAK-DETECTOR FOR VESSELS.

1,348,015.   Specification of Letters Patent.   Patented July 27, 1920.

Application filed April 20, 1918. Serial No. 229,691.

*To all whom it may concern:*

Be it known that I, HERMAN H. LEE, a citizen of the United States, residing at Brooklyn, in the county of Kings and State of New York, have invented certain new and useful Improvements in Leak-Detectors for Vessels; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in automatic sounding-wells or leak detectors for use in the holds of vessels, and in similar places; and, the invention has reference, more particularly, to a novel and simply constructed apparatus, having electrical signaling or alarm devices, which automatically operate to give warning of the rise of water in the hold of a vessel.

The present invention has for its principal object to provide a novel and simple construction of a sounding well for the purposes above indicated, which is provided with an adjustable float mechanism adapted to be set so as to control an electric circuit make and break mechanism when water rises within the well to a desired predetermined level, so as to operate an alarm or warning signal.

The present invention is, therefore, particularly adapted for use as a safety device for vessels of all kinds to indicate the rise of water in its hold which may enter through leaks sprung therein, and also for indicating the effectiveness of pumps employed to eject the water from the hold by giving warning of any gain in level of the water while the pumps are in action.

Other objects of the present invention, not at this time more particularly enumerated, will be clearly understood from the following detailed description of the same.

With the various objects of the said invention in view, the same consists primarily, in the novel automatic leak detecting device for vessels hereinafter set forth; and, furthermore, the invention consists in the several arrangements and combinations of the various parts, as well as in the details of the construction of said parts, all of which will be more fully described in the following specification, and then finally embodied in the claim which is appended to said specification.

The invention is clearly illustrated in the accompanying drawings, in which:—

Figure 1 is a vertical longitudinal section through the sounding well device, showing the upper head with the electrical make and break devices connected therewith in elevation.

Fig. 2 is an enlarged vertical longitudinal section through said upper head and said electrical make and break devices.

Fig. 3 is a horizontal cross section taken on line 3—3 in said Fig. 1, looking downward.

Similar characters of reference are employed in all of the hereinabove described views to indicate corresponding parts.

Referring now to said drawings the reference character 1 indicates the complete novel automatic sounding well, the same comprising a vertically disposed tubular body or shell 2 supported at its lower end by a base flange 3 to which it is suitably secured by any convenient means. Said base flange 3 is secured in a desired location within the hold upon the vessel's bottom, so that the body or shell extends vertically upward from said bottom through the interior of the hold. Said base flange 3 is preferably hollowed out on its under side to provide a chamber 4, and is further provided with a plurality of radiating channels or ducts 5 leading from the outer periphery of said flange to said chamber 4. That portion of the base flange immediately beneath the interior chamber 6 of the body or shell 2 is provided with a plurality of perforations or openings 7 affording communication between said chamber 4 and said interior chamber 6 of the body or shell. The side walls of said body or shell 2 are also provided at its lower end adjacent to said base flange with a plurality of openings or perforations 8 yielding access to the interior chamber 6. In order to prevent the entrance of dirt and other foreign material into the interior 6 of the body or shell 2, the exterior screen or mesh 9 is arranged over the outer ends of the openings or perforations 8, and the interior screen or mesh 10 is arranged over the inner ends of said openings or perforations 8, and a screen or mesh 11 is arranged within said chamber 4 of said base flange to extend over said openings or perforations 7 of the latter.

The reference character 12 indicates an upper metallic head, which is adapted to close the upper end of said shell or body 2, the same being secured to the latter by screw-threads 13, or by any other suitable means. Connected with the underside of said head is a centrally disposed downwardly projecting reduced extension or neck 14, preferably provided with exterior screw-threads 15. Said head 12 and its neck 14 are provided with a centrally disposed vertical opening or guideway 16.

The reference character 17 indicates a suitable float, preferably of hollow metallic construction, the same being disposed within the interior chamber 6 of said body or shell 2, so as to rise and fall therein under the influence of the rise or fall of water entering said interior chamber 6. Connected with said float is an upwardly extending rod or stem 18, the upper free end of which extends upwardly through said guideway 16 of said head 12. Arranged upon the upper end of said rod or stem 18, above said head 12, is an adjustable stop and contact collar 19, provided with a set-screw 20 or other suitable means for securing the same upon said stem in desired adjusted position.

Mounted upon the upper surface of said head 12 is a contact-post 21 provided at its lower end with a base-piece 22, and at its upper end with a forwardly projecting horizontal arm 23. Said contact-post 21 is insulated from electrical contact with said head 12 by means of an insulating washer 24 of some suitable non-conducting material, which is interposed between the same and said head 12. Said contact post is secured in position by means of a bolt 25 which extends vertically through said head 12, and which is also insulated electrically from the latter by means of a sleeve or bushing 26 of non-conducting material. The upper end of said bolt is threaded and extends upwardly through said washer 24 and base-piece 22, and metallic washer 27 and nut 28 are arranged upon said end, said nut serving to secure the contact-arm in place, and also as a means for electrically connecting with said contact arm a conductor or wire 29 leading from a suitable source of electrical energy, such as the battery 30.

The metallic head 12 provides an electrical ground, and is provided with a suitable binding post 31, or other means for connecting electrically therewith a return conductor or wire 32 which leads back to said battery 30, to complete an electric circuit. Connected in said circuit, by means of the conductor or wire 32 is an alarm bell 33, or any other suitable warning signal device.

A cover-cap 34 is provided to telescope over said head 12, to inclose the contact devices, the same having a central opening 35 through which the upper end of said stem 18 may project. Said cover-cap is further provided with a suitably disposed opening 36 through which the wires 29 and 32 may be led.

The apparatus operates as follows:—

Should the vessel in which it is arranged spring a leak the water upon entering and rising within the hold, finds access into the interior of said chamber 6 through the openings 8, and also through the channels or ducts 5 to the chamber 4 of the base-flange 3, and thence into said chamber 6 through the openings 7, consequently the water will rise within said chamber 6 to a level equal to the level attained by the same within the hold. When the rise of water is sufficient to reach the float 17, the latter is buoyed up, causing the stem 18 to rise also which carries the contact collar 19 into engagement with the arm 23 of said contact-post 21, thus closing the electric circuit, since the current will flow from the battery through said wire 29 into said contact-post and thence into said collar and stem, which electrically engaging said head 12 forms a part of the ground, and thence through the return wire 32 to the battery, passing through the alarm bell device with operative effect, so that the latter is sounded to give warning of the rise of water in the vessel's hold.

In order to indicate the depth of water at the time the alarm is sounded, and also to provide a means for adjusting the float 17, so that the same will be operatively engaged by the water when a predetermined depth is attained in the hold, I provide the stem 18 with a series of calibrations or graduations 37, which may indicate feet and fractions thereof, or any other desired measuring unit. It will be clearly understood that by setting the collar 19 with reference to this scale of graduations, the float may be normally positioned at any desired distance above the bottom of the chamber 6, so that water entering the latter will not buoy up the float unless a depth beyond the distance at which the float is set is attained thereby. By this arrangement a normal bilge may be allowed for, or the effectiveness of pumps in keeping down the level of water to a certain depth readily determined.

It will be clearly understood from the above description that my present invention provides a very simple yet effective and automatically operating safety device for vessels, adapted to give ample and sufficient warning of dangerous leaks, and that the same is particularly adapted for use on vessels tied up at wharves or docks, and under such conditions frequently under charge of a single watchman or dock man, to whom timely warning of abnormal conditions is essential to the performance of his duties.

I am aware that some changes may be made in the general arrangements and combinations of the various devices and parts of my present invention, as well as in the details of the construction thereof, without departing from the scope of the present invention as set forth in the foregoing specification, and as defined in the claim which is appended hereto. Hence, I do not limit my invention to the exact arrangements and combinations of the devices and parts as described in said specification, nor do I confine myself to the exact details of the construction of the said parts as illustrated in the accompanying drawings.

I claim:—

In a device of the kind described, a float, a stem extending vertically upward from said float, guide-means for slidably supporting said stem, a combined stop and contact collar on said stem above said guide means, a graduated scale on said stem for determining the desired adjustment of said collar thereon for the purpose of positioning the float to receive the buoying contact of fluid when the latter rises to a predetermined level, a contact-post mounted on and insulated from said guide-means adjacent to said stem, said contact-post having a horizontal portion projecting toward said stem to lie in the path of upward movement of said collar when said float and its stem rise, an electric alarm circuit grounded on one side to said guide-means and stem and electrically connected on the other side to said contact-post.

In testimony, that I claim the invention set forth above I have hereunto set my hand this 15th day of April, 1918.

HERMAN H. LEE.

Witnesses:
GEORGE D. RICHARDS,
MARION M. BANTA.